UNITED STATES PATENT OFFICE.

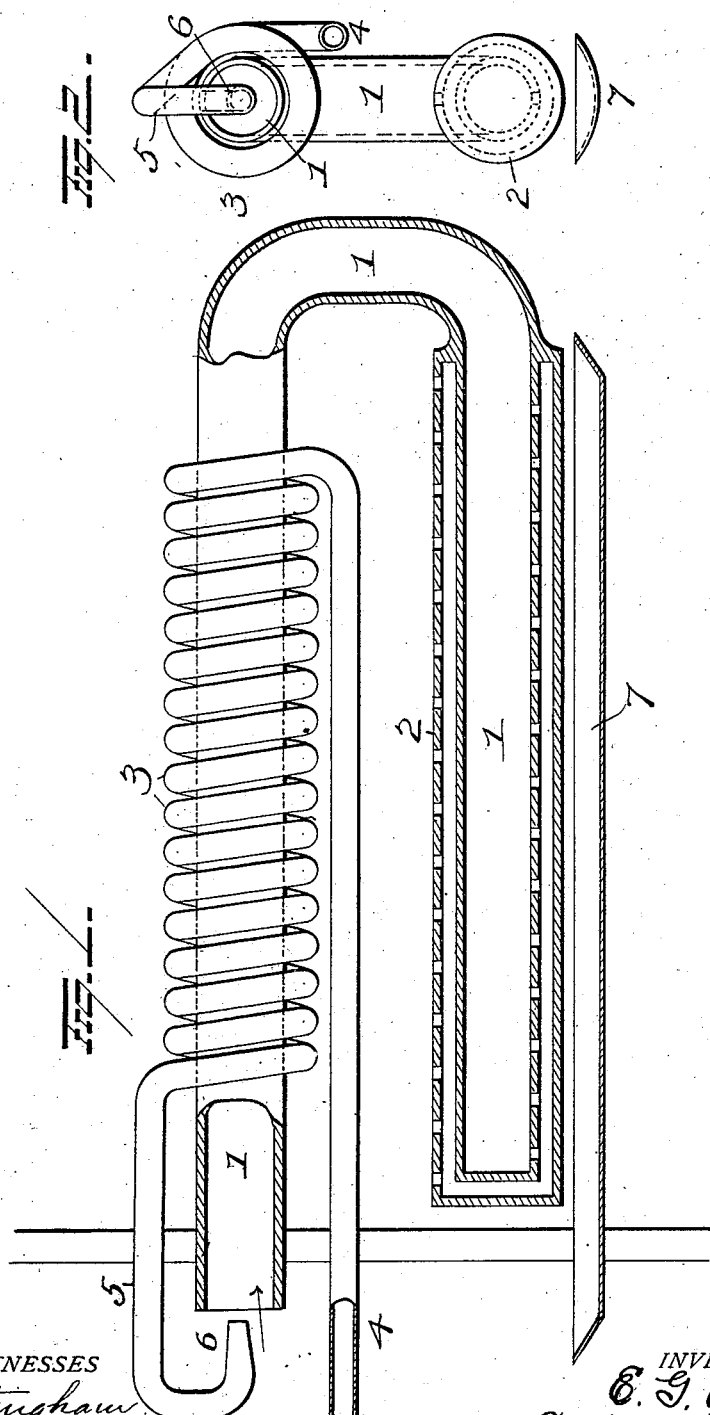

ERNEST G. OFELDT, OF BROOKLYN, NEW YORK.

LIQUID-FUEL BURNER.

SPECIFICATION forming part of Letters Patent No. 724,491, dated April 7, 1903.

Application filed November 15, 1902. Serial No. 131,527. (No model.)

*To all whom it may concern:*

Be it known that I, ERNEST G. OFELDT, a resident of Brooklyn, in the county of Kings and State of New York, have invented certain new and useful Improvements in Liquid-Fuel Burners; and I do hereby declare the following to be a full, clear, and exact description of the invention, such as will enable others skilled in the art to which it appertains to make and use the same.

My invention relates to an improved liquid-fuel burner, the object of the invention being to provide improvements of this character which will most effectually prevent the gas or products of vaporization which are generated by heat and admixture with air from condensing before it reaches the burner and to so support the oil-supply pipe upon the air-pipe as to prevent the latter from becoming too highly heated.

With these objects in view the invention consists in certain novel features of construction and combinations and arrangements of parts, as will be more fully hereinafter described, and pointed out in the claims.

In the accompanying drawings, Figure 1 is a view in section illustrating my improvements, and Fig. 2 is an end view thereof.

1 represents an air-supply tube or pipe, which is of the general U shape shown, closed at one end, where it projects into a burner-tube 2. This air-tube throughout its portion in the burner-tube is perforated along its bottom to direct the mixed gas and air into the burner-tube 2, and the latter is perforated along its upper edge, forming jet-orifices to direct the flame up against the air-tube and against a vaporizing-coil 3 around the same. This coil winds around and around the air-pipe, shielding it from the most intense heat, yet permitting it to be sufficiently heated to prevent the gas from condensing in the air-tube before it reaches the burner.

Oil is supplied to the end of the coil farthest from the inlet end of the air-pipe 1 by means of a pipe 4, and a pipe 5 conveys the gas or vapor which is generated in the coil by the heat from the burner to the inlet end of the air-pipe, where it is provided with a contracted nozzle 6 to direct the gas or vapor into the center of the air-pipe. The gas or vapor mixes with the incoming air, and this mixture passes to the burner and is burned to continue the operation above explained.

Below burner-tube 2 a pan 7 is preferably located and is adapted to be supplied with alcohol, which when ignited will start preliminary vaporization. However, a torch or other known device may be used for this purpose, if preferred.

A great many changes might be made in the general form and arrangement of the parts described without departing from my invention, and hence I do not confine myself to the precise details set forth, but consider myself at liberty to make such slight changes and alterations as fairly fall within the spirit and scope of my invention.

Having fully described my invention, what I claim as new, and desire to secure by Letters Patent, is—

1. A liquid-fuel burner, comprising a horizontal burner-tube perforated along its top, an air and vapor mixing tube located above the burner and arranged parallel therewith, and connected at one end with one end of the burner-tube, and a vaporizing-coil encircling the air-pipe and arranged to discharge the gas or vapor into the open end of the air and vapor mixing tube, substantially as set forth.

2. A liquid-fuel burner, comprising a burner-tube perforated on one side, an air and vapor mixing tube arranged parallel with the burner-tube and connected therewith, and a vaporizing-tube encircling the air-pipe and arranged to discharge the gas or vapor into the open end of the air and vapor mixing tube, the arrangement of the tube being such that the liquid fuel will be progressively heated in its passage through the vaporizing-tube, and the air and vapor will be progressively heated in its passage through the air and vapor mixing tube, substantially as set forth.

3. A liquid-fuel burner, comprising a horizontal burner-tube perforated along its top, an air-tube located above the burner-tube, bent at one end and projecting into one end of the burner-tube and perforated along its bottom in said burner-tube, and a vaporizing-coil around the air-pipe above the burner-tube directing the gas or vapor generated therein into the air-tube.

In testimony whereof I have signed this specification in the presence of two subscribing witnesses.

ERNEST G. OFELDT.

Witnesses:
  JAS. H. STRAIN,
  ALBERT STORK.